July 29, 1924.

H. A. AGRICOLA, JR 1,503,222

ATTACHMENT FOR PRINTING PRESSES

Filed Jan. 7, 1922   10 Sheets-Sheet 1

Inventor:
Herman A. Agricola, Jr.

July 29, 1924.

H. A. AGRICOLA, JR 1,503,222

ATTACHMENT FOR PRINTING PRESSES

Filed Jan. 7, 1922

Inventor:
Herman A. Agricola, Jr.
Attys

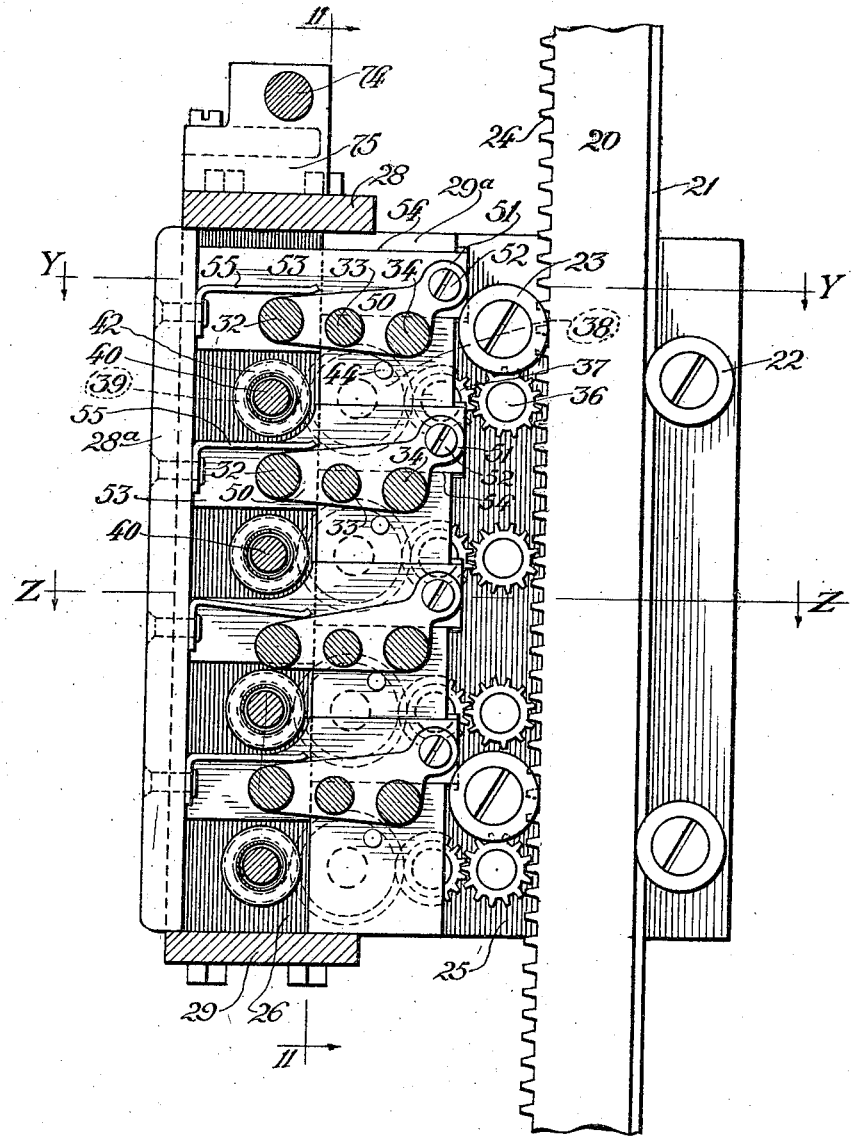

July 29, 1924.
H. A. AGRICOLA, JR
1,503,222
ATTACHMENT FOR PRINTING PRESSES
Filed Jan. 7, 1922     10 Sheets-Sheet 6
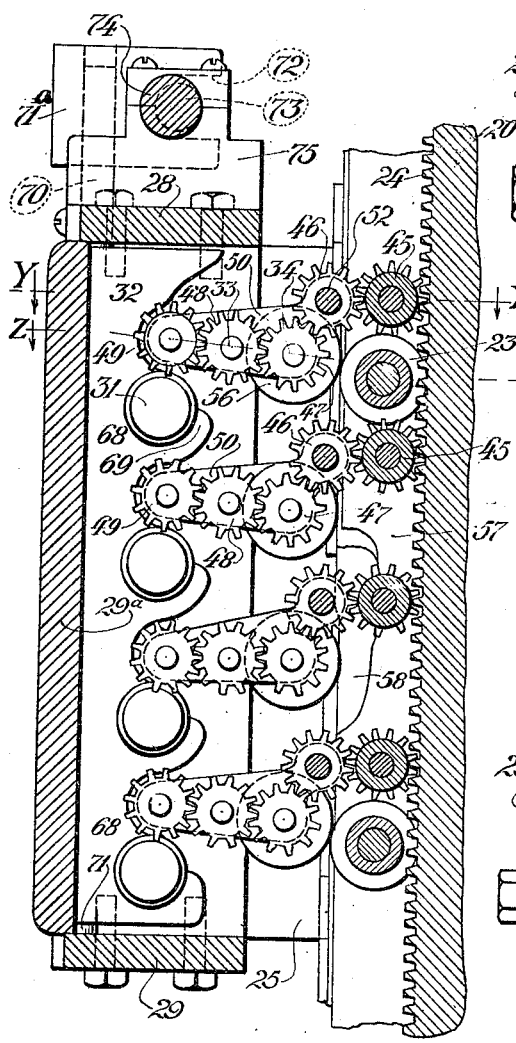
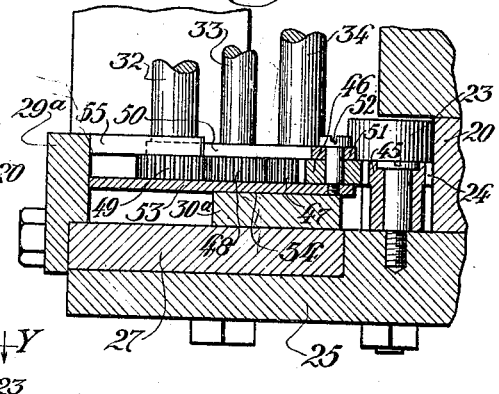
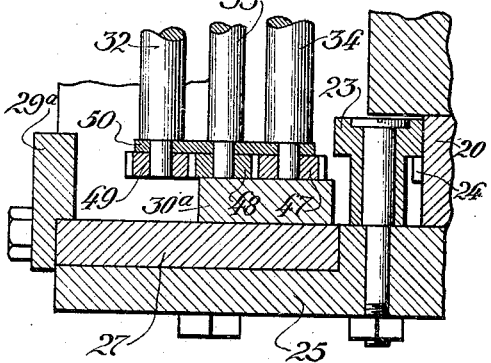
Inventor:
Herman A. Agricola, Jr.

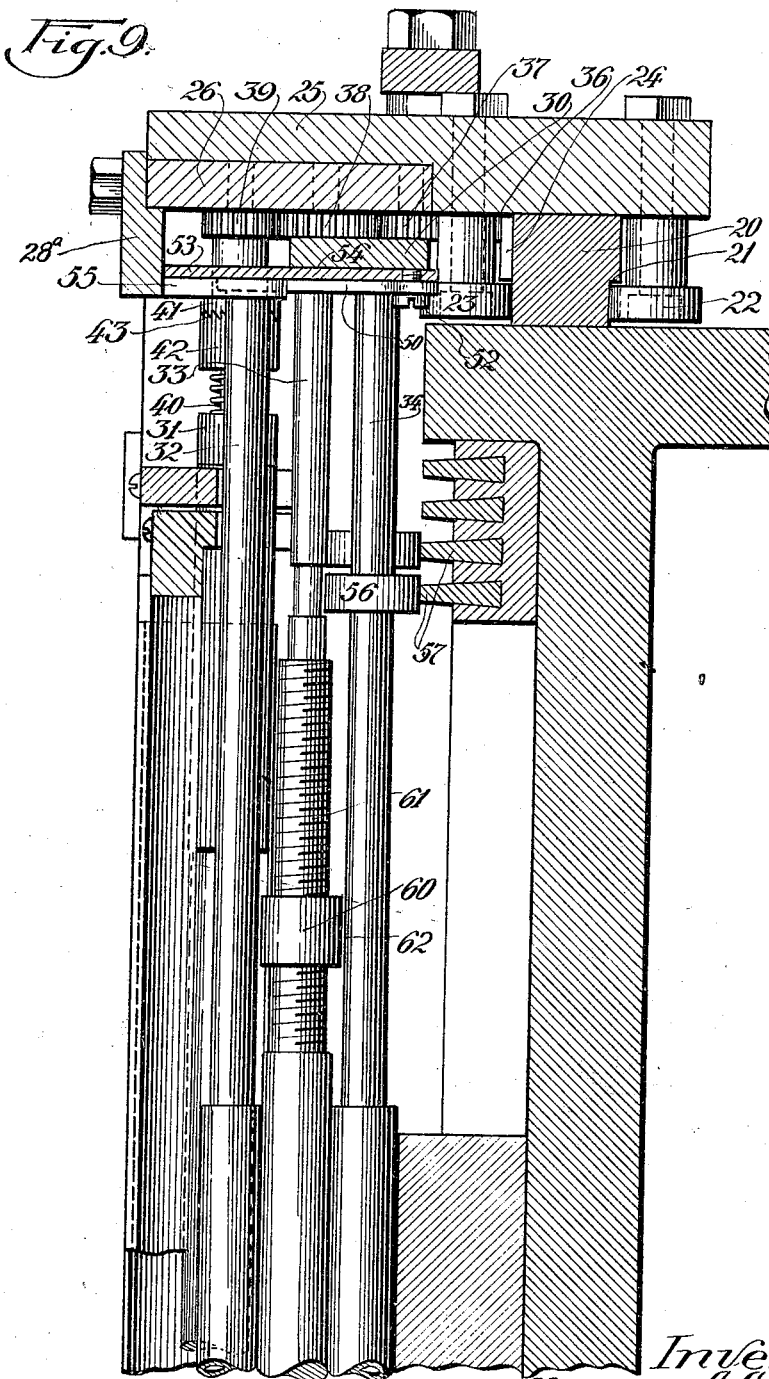

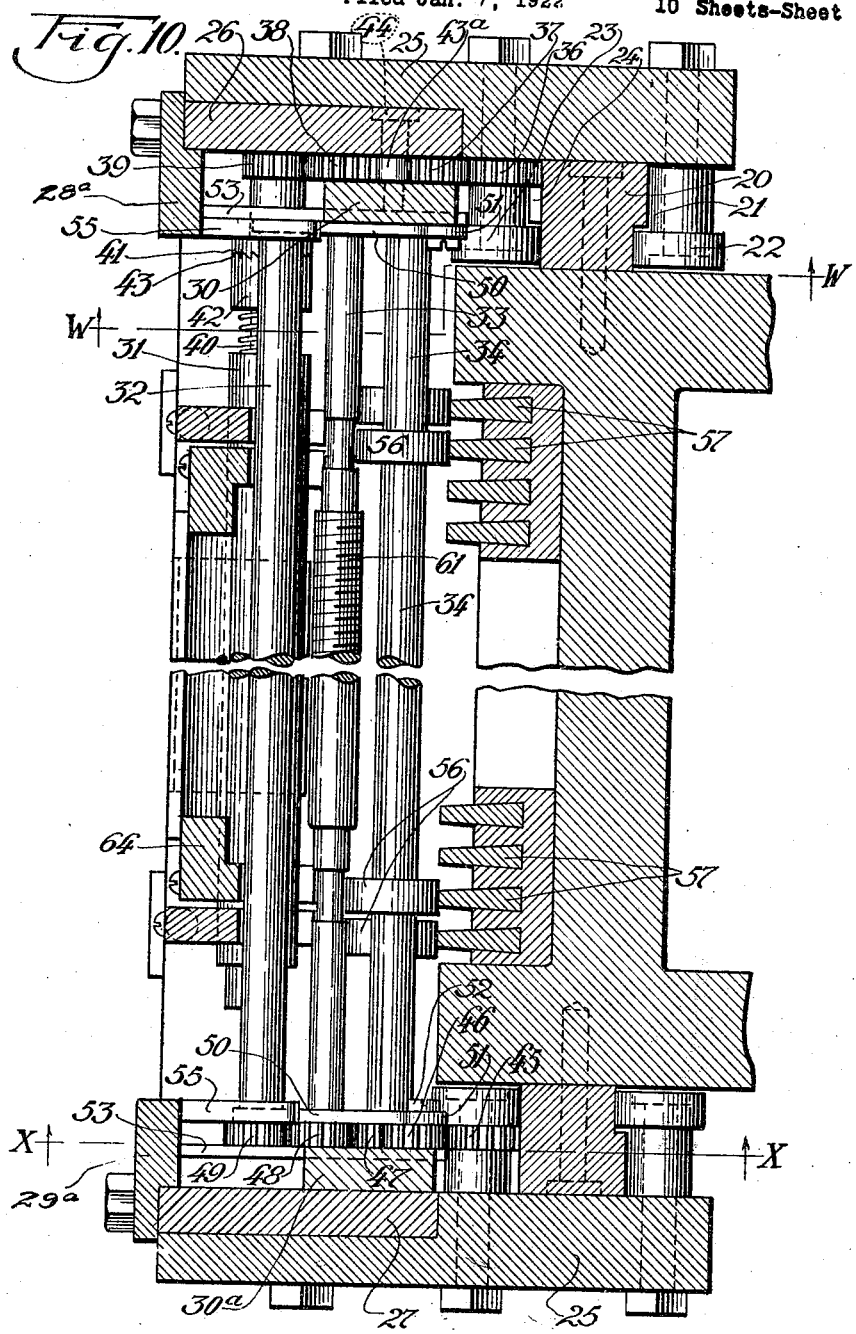

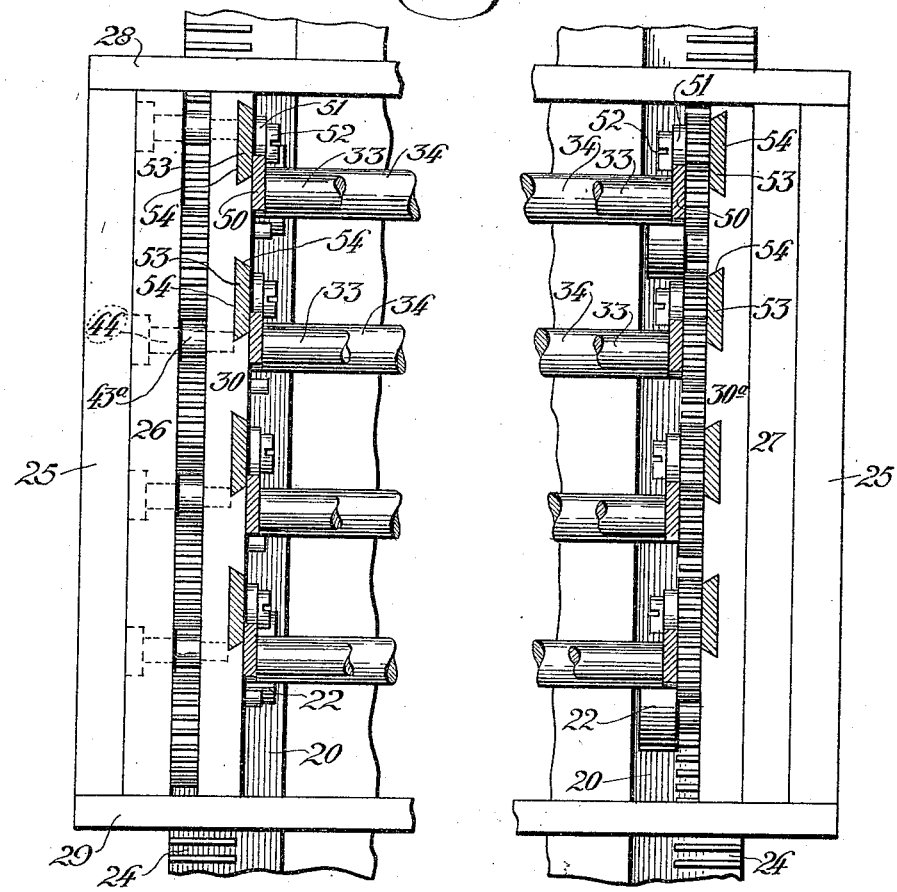
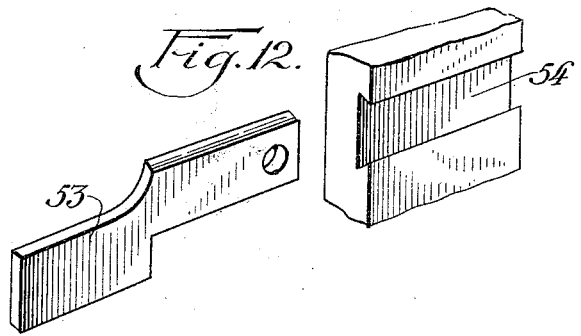

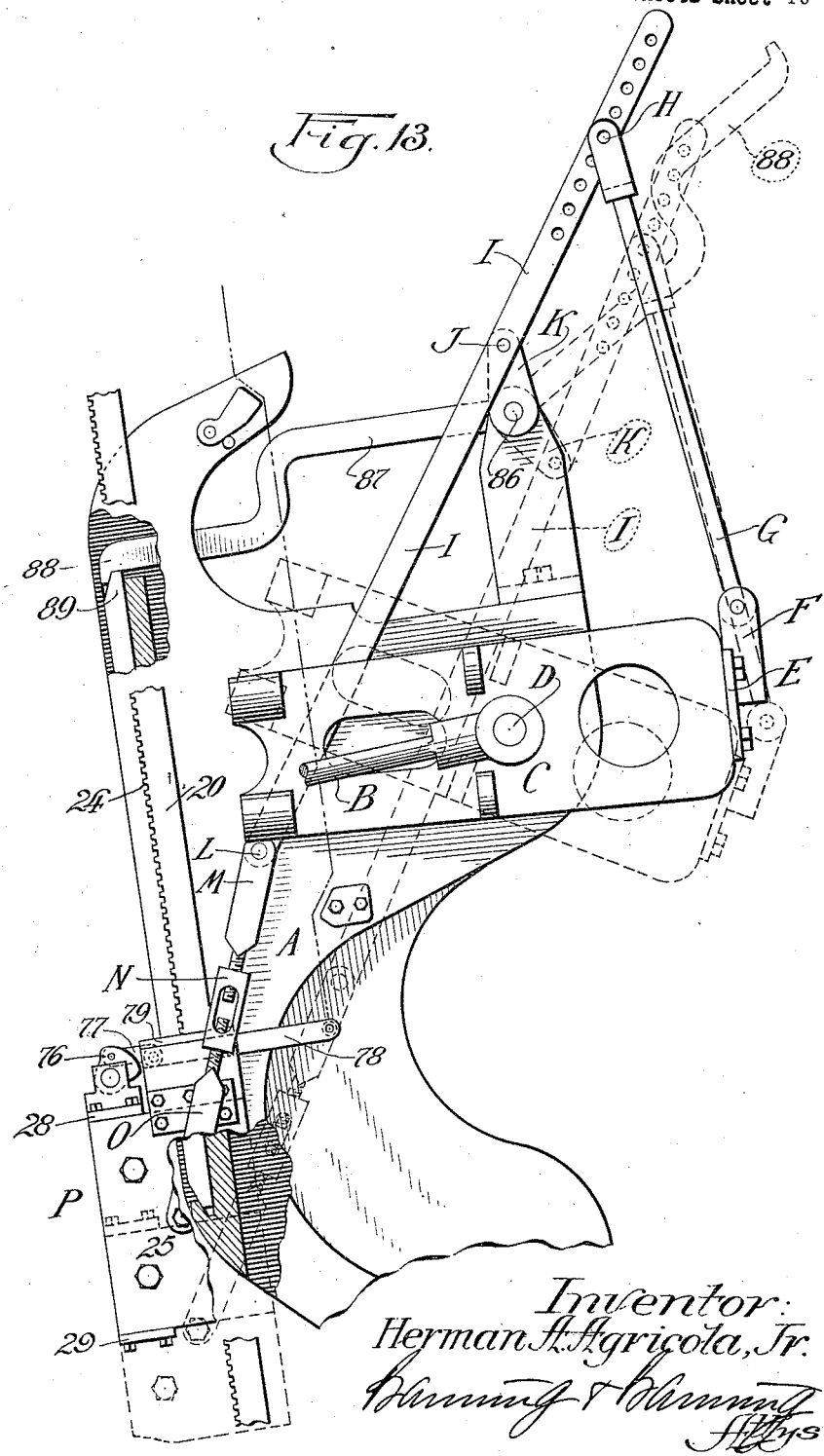

Patented July 29, 1924.

1,503,222

UNITED STATES PATENT OFFICE.

HERMAN A. AGRICOLA, JR., OF ATLANTA, GEORGIA, ASSIGNOR OF FORTY-NINE PER CENT TO JOSEPH E. LANE, OF ATLANTA, GEORGIA.

ATTACHMENT FOR PRINTING PRESSES.

Application filed January 7, 1922. Serial No. 527,574.

*To all whom it may concern:*

Be it known that I, HERMAN A. AGRICOLA, Jr., a citizen of the United States, residing at Atlanta, in the county of Fulton and State of Georgia, have invented certain new and useful Improvements in Attachments for Printing Presses, of which the following is a specification.

The present invention constitutes an improvement of that set forth in my application Serial No. 420,627, filed October 30, 1920. The invention is designed as an attachment for printing presses of the standard type, for the purpose of permitting the printing of multicolor work upon such presses. The invention effects the above result by the employment of a movable carriage which supports the inking, distributing and printing rollers, and effects a rotation thereof by the provision of a fixed rack and intermeshing train of gears which serve to impart rotation to the rollers by reason of the reciprocation of the carriage.

The position of the sets of rollers with respect to the chase which contains the type is controlled by means of rollers traveling on guideways of the proper configuration to allow the printing rollers to contact those portions of the type to which it is desired to apply ink of a given color, so that by properly adjusting the trackways various portions of the type can be individually inked with the desired color.

The above features are common to my application previously referred to, and the present invention is designed to utilize these features of construction in a more advantageous manner.

The invention particularly pertains to the means provided for quickly removing the sets of rollers for the purpose of cleaning or otherwise; to the means provided for insuring contact between the inking and distributing rollers only on the down stroke of the carriage; to the means provided for throwing the carriage to a depressed position for the purpose of securing better access to the type contained within the chase; to an improvement in the arrangement of the pan for containing the ink; and to the general construction of the machine as a whole and the individual portions thereof.

In the drawings:

Fig. 5 is a similar view, taken near one end thereof on line 5—5 of Fig. 3;

Fig. 6 is a similar view, taken on line 6—6 of Fig. 3;

Fig. 7 is a sectional detail, showing the plate for supporting the bracket carrying a set of rollers, together with the associated parts;

Fig. 8 is a similar view, showing the bearings and mountings for a set of rollers;

Fig. 9 is a sectional plan view looking downwardly on the carriage, showing the trackway and traveling rollers for controlling the action of the brackets which carry the rollers, one end being broken away;

Fig. 10 is a similar view, showing the center portion of the structure broken away;

Fig. 11 is a front elevation of the end portions of the carriage, showing the roll brackets and supporting plates in section;

Fig. 12 is a perspective detail, showing one of the roller bracket plates removed from its slideway;

Fig. 13 is a side elevation of the upper portion of the press, showing the carriage lowered to permit access to the chase.

Figure 1:
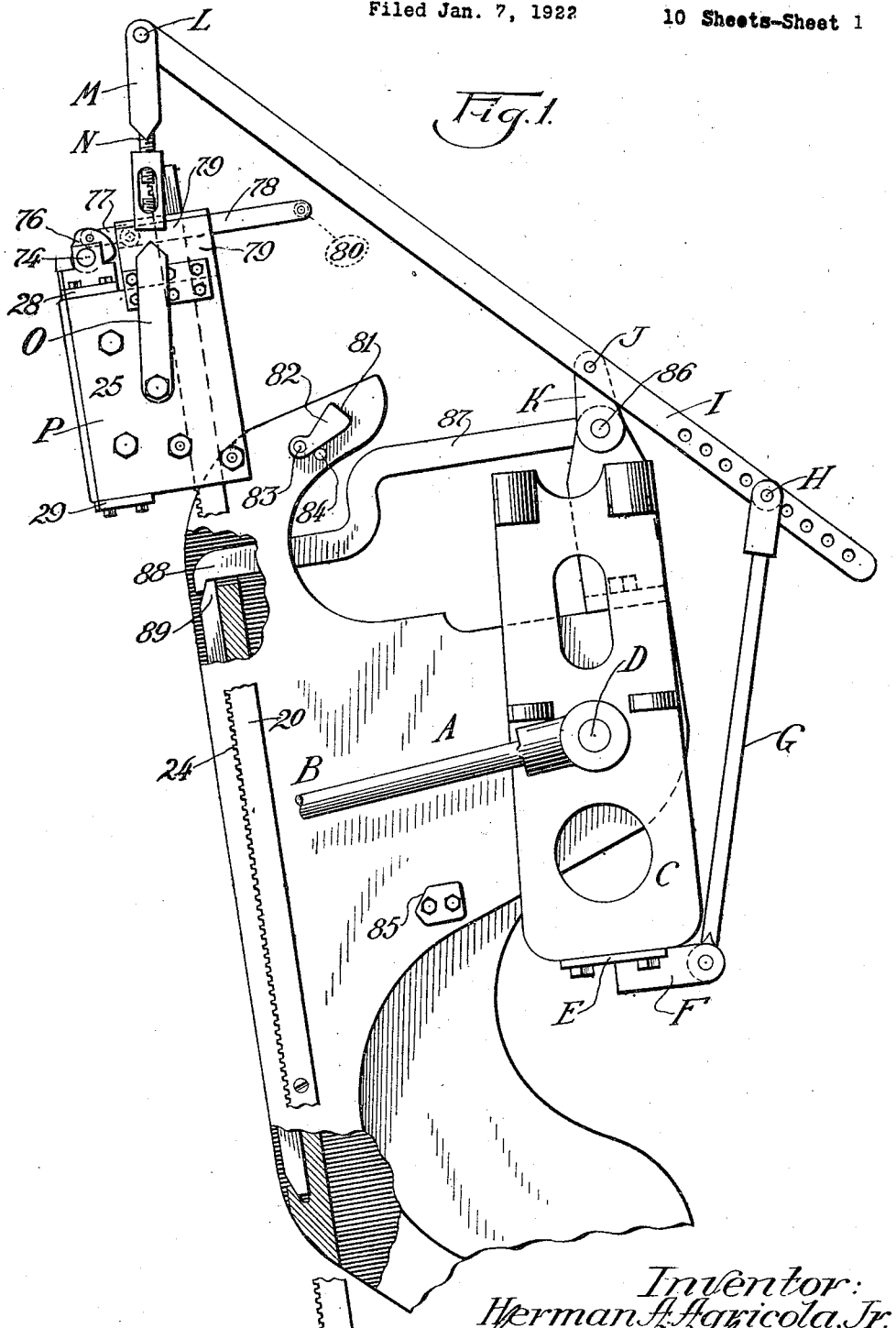
Figure 1 is a side elevation of the upper portion of a printing press of standard type, showing the carriage attachment in its elevated position.

For purposes of describing the features of the present invention, the same has been shown in connection with a job printing press A which is pivoted to oscillate about a horizontal axis through the medium of a pitman B actuated by a suitable source of power. The press is provided with the usual rocker arm C arranged to oscillate about an axis D. The arms C which lie upon opposite sides of the press are connected by means of a plate E on which is carried a pair of brackets F for pivotally supporting two links G which are adjustably connected at H with rocker arms I pivoted at J to a suitable bracket or support K.

At the end of each rocker arm is a pivotal connection L to an arm M to which is secured a turnbuckle N connecting the arm with a lower arm O. The parts thus connected are adapted to reciprocate upon the forward side of the press and serve as supports for a carriage P which contains most of the features of the present invention.

In the particular press here shown for purposes of illustration, the carriage moves in a straight line upon the front of the press, but the carriage may be otherwise mounted so as to move in a circular or angular path, or in the case of a rotary press relative movement may be secured with the carriage remaining stationary.

Referring particularly to Figs. 9 and 5, it will be noted that the carriage is arranged to travel upon guide rails 20 each of which on its rear inner face is shouldered at the point 21 to afford a guideway for the contact of a rear roller 22 which co-operates with a forward roller 23 bearing against the opposite face of the guide rail. The forward roller lies laterally within a rack 24 on the forward face of the guide rail. The carriage structure and its guiding means are duplicated at each end.

The carriage frame comprises end plates 25 each of which is shouldered down on its inner face to receive head plates 26 and 27, the inner faces of which lie flush with the inner faces of the end plates. The end plates are connected by means of top and bottom plates 28 and 29 and front plates 28ª and 29ª which give to the carriage frame, as a whole, the form of a rectangular structure having enclosed front corners at each end, the parts being bolted or otherwise rigidly secured together.

Figure 2:
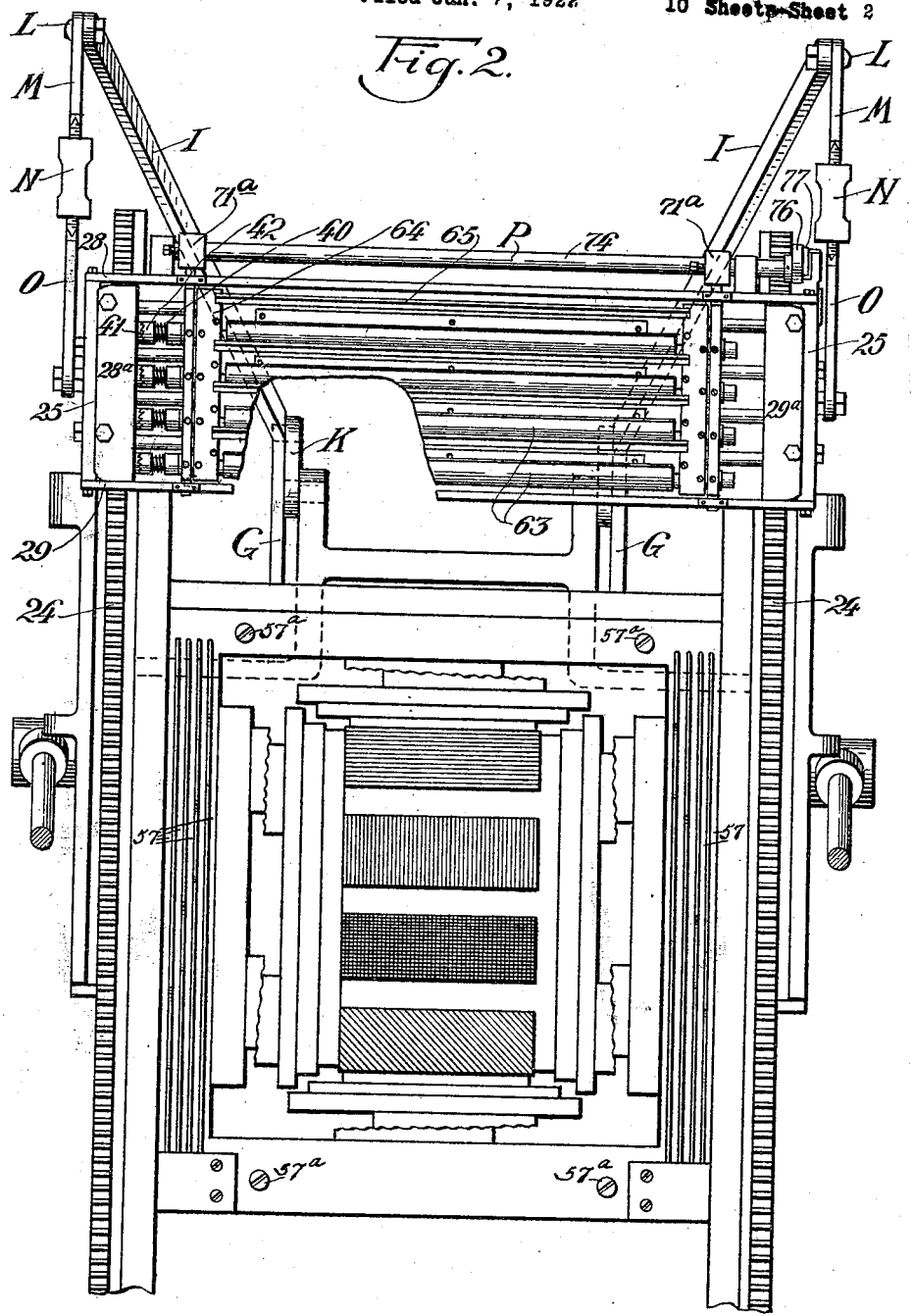
Fig. 2 is a front elevation of the same, showing the chase having the type sections inserted therein.

At the left hand of the carriage, when viewed from the front as in Fig. 2, and as well illustrated at the top in Fig. 10, the frame is provided with a vertically disposed inner roller supporting bar 30 which is held in spaced relation to the proximate end plate 26. At the opposite end of the frame is a similar roller supporting bar 30ª which, however, abuts directly against the proximate head plate 27.

The bars above described afford means for supporting the sets of rollers, the construction and operation of which constitute the essential features of the present invention.

Figure 4:
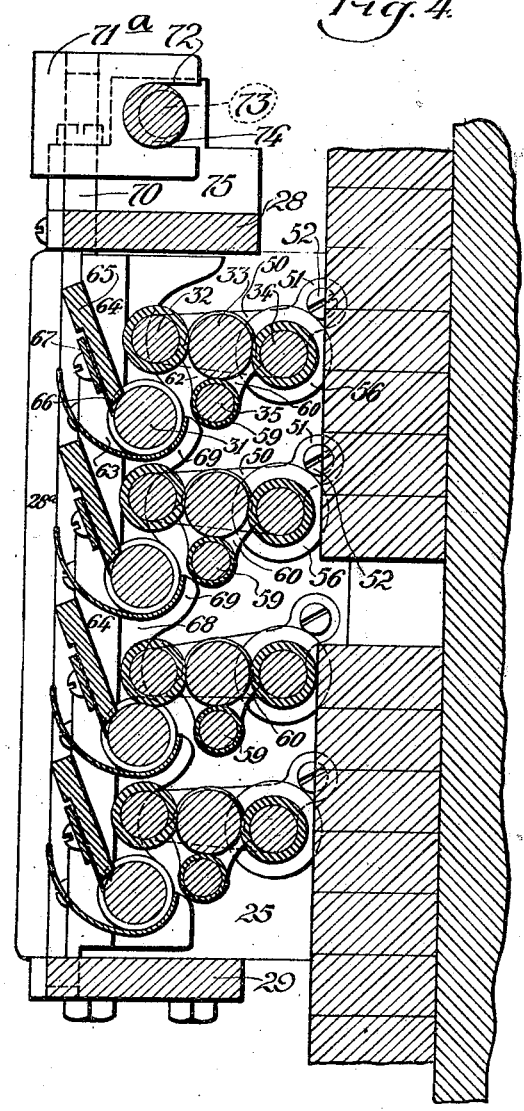
Fig. 4 is a cross sectional elevation of the carriage, taken through the center thereof.
Figure 14:
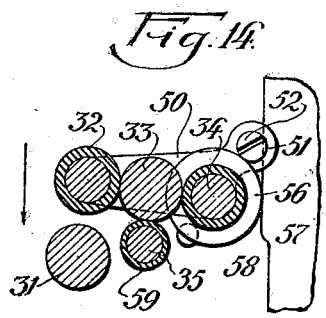
Figs. 14, 15 and 16 are details, showing one of the roller brackets in various positions of adjustment.
Figure 15:
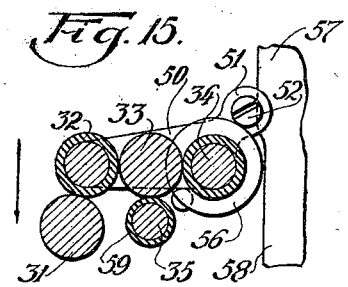
Figure 16:
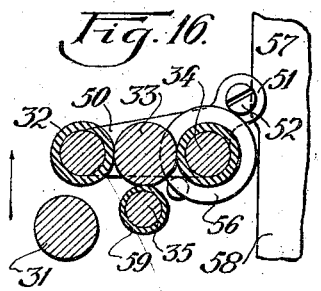

The rollers now to be described are arranged in series, one series for each color to be printed, and each series, as shown in Fig. 4, consists of an ink supply roller 31 which maintains a fixed relation with respect to the frame of the carriage, and a set of four rollers 32, 33, 34, and 35 which are mounted in adjustable relation to the ink supply roller. For purposes of description, the roller 32 may be appropriately called the transfer roller, the roller 33 the intermediate distributing roller, the roller 34 the inking roller, and the roller 35 the spreading roller. With the adjustable set of rollers making contact with the ink supply roller, as indicated in the lower portion of Fig. 4, the ink will pass from the ink supply roller to the transfer roller, thence to the intermediate distributing roller, and thence to the inking roller, from which it is supplied to the blocks of type from which the impressions are taken.

The spreading roller which bears only against the intermediate distributing roller is mounted to move longitudinally thereof to effect a longitudinal spreading of the ink on the distributing roller. All of these rollers, with the exception of the longitudinally movable spreading roller are positively rotated by intermeshing gears. The spreading roller is moved longitudinally by a traveling rider, but is rotated only by contact with the intermediate distributing roller 33. The nature of this structure is such as to require one set of gears to rotate the fixedly positioned ink supply roller, and another set of gears to operate the sets of the adjustably mounted ink transmission rollers. These sets of gears are located at opposite ends of the carriage and will now be described in detail.

The sets of gears for rotating the ink supply rollers are illustrated at the top of Fig. 10. This set comprises a rack engaging gear 36, a first intermediate gear 37, a second intermediate gear 38, and a final gear 39 mounted on the shaft 40 which carries the ink supply roller, which shaft is located near the front side of the carriage and extends horizontally from end to end thereof between the head plates 26 and 27. The final gear 39 is rigidly secured to a clutch element 41 which co-acts with a spring backed clutch element 42, which latter is splined or otherwise fixedly held in rotative relation to the ink supply roller 41, so that these parts will rotate in unison. The arrangement is such that when the gear 39 is rotated in one direction, the co-acting teeth 43 on the clutch elements, which are of the saw-toothed variety, will grip and engage each other so that rotation will be imparted to the ink supply roller, but rotation of the gears in reverse direction will cause a yielding of the engaging clutch elements 42, and a disengaging of the teeth, with the result that the ink supply rollers will have rotation imparted thereto only upon the down-travel of the carriage which is desirable in order to prevent an oversupply of ink being delivered to the type.

The sets of gears heretofore described are located behind the roller supporting bar and in the space intermediate this bar and the proximate head plate 26. The bar is held in spaced relation to the plate by the interposition of sets of blocks 43ª which encircle the bolts 44 by which the bar is secured to the head plate.

The gearing for rotating the adjustable set of ink transmission rollers will now be described.

Referring to Fig. 6, it will be noted that this gearing comprises a rack engaging pinion 45, a pivotal pinion 46, a first, second and third transmission pinions 47, 48, and 49, which three latter pinions are mounted respectively upon the rollers 34, 33 and 32.

The ink transmission rollers are journaled at each end in swinging brackets 50, each bracket being provided with an arm 51 pivoted on a stud 52, which stud furnishes the bearing for the pivot gear 46, so that the intermeshing of the train is maintained at all times irrespective of the angular adjustment of the brackets which carry the rollers. It will be noted from Fig. 10 that the bracket 50 at the lower side of the figure is located in spaced relation to the proximate vertical roller supporting bar 30ª which provides space for the interposition of the gear train just described, while the corresponding bracket 50 which journals the opposite ends of the rollers lies in face contact with the proximate vertical roller supporting bar 30, the gears being located at but one end of the roller set. Each of the brackets is mounted upon a slide plate 53 which is slidably mounted within a dovetailed groove 54 in the proximate roller supporting plate, which arrangement permits the entire set of inking rollers to be removed as a unit for the purpose of cleaning, repair, or substitution.

The forward ends of the respective slide plates (see Fig. 2) abut against the proximate vertical front plates 28ª and 29ª which are removable to facilitate the withdrawing of the slide plates. Each of the pivotal brackets 50 is engaged at its forward or free end by a spring 55 secured to the proximate vertical front plate which bears downwardly upon the bracket and tends to hold the ink transfer roller of the set into contact with the proximate ink supply roller, which condition is indicated by the third set of rollers shown in Fig. 4.

In order to interrupt the normal contact of the ink supply roller and the proximate transfer roller, the following means are provided. The roller 34 at points laterally distant from the center or inking point of the roller is provided with a pair of wheels 56 which ride on rails 57 (see Figs. 9 and 10) supported in the chase of the printing press on each side of the space occupied by the type. A pair of rails is provided for each set of inking rollers, and the configuration of these rails regulates the application of the ink to those portions of the type which are intended to be inked by each of the respective color sets. The chase frame is adjustable with respect to the rollers by means of adjusting screws 57ª (Fig. 2).

The contact edges of the rails 57 are provided with suitably disposed recesses or cuts 58 (see Fig. 6), these cuts occurring at points corresponding to those on which the ink of a specified color is to be applied, with the result that as the carriage is moved up and down across the face of the type in the chase, the wheels 56 will ride upon the uncut portions of the rails and thereby hold the roller brackets in their elevated position as indicated in the first two upper sets of Fig. 5, but as soon as the companion wheels encounter the companion cuts or depressions in the pair of rails on which they are riding, they will enter such cuts or depressions and thereby allow the springs 55 to act upon the free ends of the brackets to depress the same and cause the ink transfer roller to contact with the ink supply roller, and the inking roller to engage the surface of the adjacent section of type and apply ink of appropriate color thereto, as indicated by the adjustment of the third set of rollers in Fig. 4. The tracks thus control the points of application of ink of a specified color, and the tracks in effect constitute a master pattern for controlling the varying distribution of different colored inks.

The ink distributing portion of the spreading roller 35 is in the form of a slidable sleeve 59 (see Fig. 4), which sleeve is engaged at opposite ends by rider brackets 60 which are threaded onto threaded portions 61 of the overlying intermediate roller from which the brackets are suspended, and each of the brackets is provided with oppositely disposed wings 62 (see Fig. 4), which bear against adjacent portions of the transfer roller and inking roller so as to hold the brackets against lateral displacement and permit the same to travel back and forth and transversely of the carriage as the same is reciprocated vertically.

Since the rider brackets are held against rotation, they will be compelled to move longitudinally of the threaded shaft sections as the latter are rotated. This arrangement ensures endwise distribution of the ink in the central ink distributing portion of the intermediate roller, thereby tending to spread out or work down unevenly disposed portions of the film of ink on the surface of the roller.

The inking roller receives its supply of ink of appropriate color from a pan 63, the bottom of which is substantially concentric with the associated roller, the pan being supported from vertically disposed bars 64 which also serve as a support for obliquely set transverse cross bars 65 which are recessed to receive knife blades 66 secured to the cross bars by clamping plates 67. The edges of the knife blades present themselves obliquely downward to the surface of the respective ink supply rollers, so that as the same are rotated in a clockwise direction, as indicated in Fig. 4, the surplus supply of ink will be scraped off and fall back into the pan. The pans and knives are made removable for cleaning or substitution.

Figure 3:
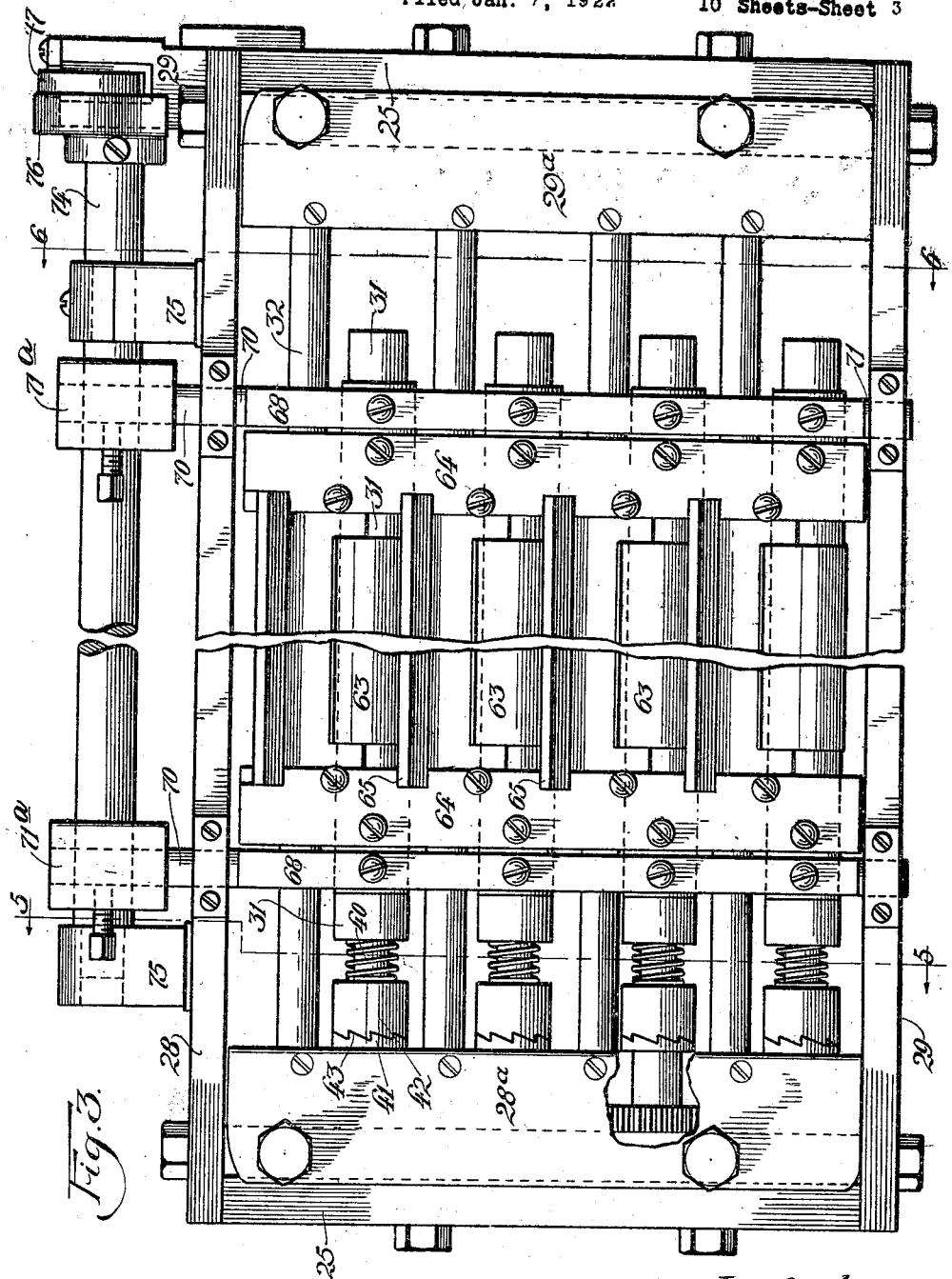
Fig. 3 is an enlarged front elevation of the carriage, with the middle section broken out.

It has been found desirable to interrupt the transference of ink during the one-half of each ink reciprocation of the carriage, and for this purpose means are provided to interrupt the contact between the ink supply rollers and the transfer rollers during one-half of each reciprocation. The means for obtaining this result are as follows: The ink supply rollers are journaled at each end in a bracket bar 68 provided with rounded brackets 69 to receive and journal the rollers, and the bars 68 (see Figs. 3 and 4) are slidably guided between the upper and lower bars 28 and 29 of the carriage frame, the bracket bars being provided with upper and lower spindles 70 and 71 respectively. The upper end of each upper spindle is secured within a head piece 71$^a$ provided on its rear face with a slot 72 which embraces an eccentric reduced portion 73 of the shaft 74 journaled in standards 75 mounted upon the upper cross bar of the frame, which arrangement imparts a very slight reciprocation to the bracket bars with each rocking movement of the shaft 74.

The shaft 74 carries at one end a crank plate 76 (see Figs. 1 and 3), which crank plate has pivoted thereto a link 77 which, in turn, is pivoted to a slide bar 78 slidably mounted in a guide plate 79 upstanding from the end of the carriage. The slide bar 78 on its rear end is provided with a roller 80 which on the downstroke of the carriage will ride against the obliquely disposed face 81 of a cam dog 82 pivoted to a pin 83 and abutting against a stop 84 on the upper portion of the printing press to allow clearance of the roller on the reverse stroke.

The cam face 81 is so disposed that as the roller rides downwardly, it will be slightly retracted, thereby rocking the shaft 74 in a clockwise direction as viewed in Fig. 1. This will impart a slight lifting movement to the bracket bars which carry the ink supply rollers and lift these rollers into such position that they will be engaged by the transfer rollers when the depressions in the several trackways are encountered.

A reverse movement is imparted to the slide bar 78 by an obliquely disposed cam plate 85 mounted on the printing press at a point contiguous to the lower limit of travel of the carriage, and when this surface is encountered, the rock shaft 74 will be rotated in reverse direction and the ink supply rollers all lowered to a point out of reach of the transfer rollers irrespective of track conditions. By these means the inking is effected during only one-half of the travel of the carriage, which results in a better distribution of ink and economy in the use thereof.

Means are provided for lowering the carriage to a point below its normal limit of travel in order to better secure convenient access to the chase and the types supported therein. These means are best illustrated in Fig. 13.

The bracket K which carries the lever arm I which reciprocates the carriage is pivoted on a horizontal pin 86 and is rigidly connected with a forwardly extending arm 87 which is provided on its end with a hook 88 which engages with a lug or block 89 secured to the structure of the printing press. In the normal operation of the machine, the bracket K will occupy the upstanding position shown in full lines in Fig. 13, and the limit of down travel of the carriage will be regulated from this point. When, however, it is desired to still further lower the carriage, the arm 88 is unhooked and thrown back into position indicated by dotted lines. This lowers the bracket K and with it the lever I which results in a lowering of the carriage to a position indicated by dotted lines.

In operation the track rails are cut in conformity with color schemes intended to be reproduced, and these track rails are inserted in the chase and placed in the bed of the printing press. The desired colors are then poured into the respective color troughs and the printing operation proceeds. On each reciprocation of the carriage through the raising and lowering of the lever I, rotative movements will be imparted to each set of ink transmission rollers first in one direction and then in the other. The guide wheels 56 traveling on the track rails will regulate the position of the brackets which carry the ink transmission rollers and when depressions are encountered in a pair of track rails, the associated brackets will swing inwardly and effect an inking of that portion of the type which corresponds in position to the depressions in the track rails.

At the same time power will be imparted from the racks and through the train of pinions to the ink supply rollers which will be positively rotated in one direction only by the clutch arrangement, and during the period of time rotation is being imparted to the ink supply rollers, they will be held in elevated position by the eccentrics on the rock shaft, so that with each inswing of a roller bracket, the transfer roller will be brought into contact with the ink supply roller and receive a supply of ink thereon, and the contact of these two rollers will be simultaneous and commensurate with the delivery of ink to the corresponding portions of type, so that the transference of ink will be in ratio to the amount required by the type surface devoted to each color.

The rotation of the intermediate distributing rollers will effect a longitudinal travel of the spreading roller which will thus assist in equally distributing the ink longitudinally over all the portions of the associated distributing roller.

The various parts composing the inking sets of the present invention are all arranged for easy removal and substitution, and means provided for dropping the carriage below its normal level permit easy access to the chase and type.

Although the invention has been described with particularity as to detail, it is not the intention to limit the invention to the precise structure shown which may be modified in numerous details without departing from the scope of the invention.

I claim:

1. In combination with a printing press, a carriage adapted for reciprocation thereon, a chase mounted on the press, an ink supply receptacle mounted in the carriage, co-operating means on the carriage and chase and adapted with each reciprocating stroke of the carriage to transfer ink to certain selected portions of the type, such means including contacting rollers, and means for holding the last of said rollers out of contact with the type during a portion of each reciprocation, substantially as described.

2. In combination with a printing press, a carriage adapted for reciprocation thereon, a chase mounted on the press, an ink supply receptacle mounted in the carriage, co-operating means on the carriage and chase and adapted with each reciprocating stroke of the carriage to transfer ink to certain selected portions of the type, such means including contacting rollers, means for holding the last of said rollers out of contact with the type during a portion of each reciprocation, and means for effecting longitudinal distribution of ink on one of said rollers, substantially as described.

3. In combination with a printing press, a carriage adapted for reciprocation thereon, a chase mounted on the press, an ink supply receptacle mounted in the carriage, co-operating means on the carriage and chase and adapted with each reciprocating stroke of the carriage to transfer ink to certain selected portions of the type, such means including contacting rollers, means for holding said rollers out of contact during a portion of each reciprocation, and means for moving the carriage to a point beyond its normal limits of travel, substantially as described.

4. In combination with a printing press, a carriage adapted for reciprocation thereon, a chase mounted on the press, an ink supply receptacle mounted in the carriage, co-operating means on the carriage and chase and adapted with each reciprocating stroke of the carriage to transfer ink to certain selected portions of the type, such means including contacting rollers, means for holding said rollers out of contact during a portion of each reciprocation, means for effecting longitudinal distribution of ink on one of said rollers, and means for moving the carriage to a point beyond its normal limits of travel, substantially as described.

5. In combination with a printing press, a carriage adapted for reciprocation thereon, a chase mounted on the press, a plurality of ink receptacles mounted in the carriage, an ink supply roller receiving ink from each receptacle, sets of ink transmission rollers, mountings for moving said sets of rollers towards and from selected portions of the type, and means for alternately shifting the position of the ink supply rollers to allow contact with the ink transmission rollers only at predetermined intervals, substantially as described.

6. In combination with a printing press, a carriage adapted for reciprocation thereon, a chase mounted on the press, a plurality of ink receptacles mounted in the carriage, an ink supply roller receiving ink from each receptacle, sets of ink transmission rollers, mountings for moving said sets of rollers towards and from selected portions of the type, and means for alternately shifting the positions of the ink supply rollers to allow contact with the ink transmission rollers only at predetermined intervals, said means including mountings for said rollers adapted to be shifted back and forth with each reciprocation of the carriage, substantially as described.

7. In combination with a printing press, a carriage mounted for reciprocation in proximity to the type carried by said press, a plurality of ink supply rollers carried by the carriage, means for rotating said rollers in one direction only, sets of ink transmission rollers, mountings for the sets of ink transmission rollers, and means for moving said mountings to bring the members of the set of transmission rollers concurrently into contact with the ink supply roller and selected portions of the type, substantially as described.

8. In combination with a printing press, a carriage mounted for reciprocation in proximity to the type carried by said press, a plurality of ink supply rollers carried by the carriage, means for rotating said rollers in one direction only, sets of ink transmission rollers, mountings for the sets of ink transmission rollers, means for moving said mountings to bring the members of the set of transmission rollers concurrently into contact with the ink supply roller and selected portions of the type, and means for moving the ink supply rollers vertically to positions beyond the range of contact of the proximate members of the sets of ink transmission rollers, substantially as described.

9. In combination with a printing press, a carriage mounted for reciprocation in proximity to the type carried by said press, a plurality of ink supply rollers carried by the carriage, means for rotating said rollers in one direction only, sets of ink transmission rollers, mountings for the sets of ink transmission rollers, means for moving said mountings to bring the members of the set of transmission rollers concurrently into contact with the ink supply roller and selected portions of the type, means for moving the ink supply rollers vertically to positions beyond the range of contact of the proximate members of the sets of ink transmission rollers, a longitudinally movable spreading roller in contact with one member of each of the transmission sets, and means for longitudinally moving said spreading rollers, substantially as described.

10. In combination with a printing press provided with racks and carrying type, a carriage mounted for reciprocation across the face of the type, a plurality of ink supply rollers carried by the carriage, a gear train for each ink supply roller in engagement with one of the racks, sets of ink transmission rollers, and gear trains between each set of transmission rollers and the other of said racks, said gear trains being located at opposite ends of the carriage, substantially as described.

11. In combination with a printing press provided with racks and carrying type, a carriage mounted for reciprocation across the face of the type, a plurality of ink supply rollers carried by the carriage, a gear train for each ink supply roller in engagement with one of said racks, sets of ink transmission rollers, gear trains between each set of transmission rollers and the other of said racks, said gear trains being located at opposite ends of the carriage, and means operable concurrently with the reciprocation of the carriage for periodically shifting the ink supply rollers to a position out of the range of contact with the associated rollers of the ink transmission set, substantially as described.

12. In combination with a printing press and type carried thereby, a rack on each side of the space occupied by the type, a carriage mounted to reciprocate across the face of the type, an ink supply roller carried by said carriage, gearing in train between one of said racks and the ink supply roller, ink transmission rollers associated with said ink supply roller, a movable mounting for said ink transmission rollers, means for regulating the movements of said mounting to make contact with the type surface at predetermined points, gearing between said transmission rollers and the other rack and adapted to remain in train irrespective of the movements of the mounting, one of said last named rollers being threaded, and a spreading roller having its inking surface supported from a rider bracket adjustable endwise by rotation of the said threaded roller, substantially as described.

13. In combination with a printing press provided with type, a carriage movable across the face of the type, an ink distributing roller carried by the carriage and having threads thereon, an ink spreading roller in contact with the distributing roller, a rider threaded onto the threaded portion of said distributing roller and journaling the spreading roller, means for holding said rider against rotative movements, and means for rotating the distributing roller to effect endwise movement of the spreading roller, substantially as described.

14. In combination with a printing press, a carriage mounted for reciprocation in proximity to the type carried by said press, an ink supply receptacle mounted in the carriage, means adapted with each reciprocating stroke of the carriage to transfer ink to certain selected portions of the type, said means including an ink supply roller adapted to feed ink from the receptacle, and an inking roller adapted to contact the type, and means for concurrently bringing the inking roller into contact with a selected portion of the type, and for bringing said inking roller into inking train with the ink supply roller, substantially as described.

HERMAN A. AGRICOLA, Jr.

Attest:

H. H. TROTTI.